(12) United States Patent
Weindorf

(10) Patent No.: US 6,479,810 B1
(45) Date of Patent: Nov. 12, 2002

(54) LIGHT SENSOR SYSTEM AND A METHOD FOR DETECTING AMBIENT LIGHT

(75) Inventor: Paul Frederick Luther Weindorf, Novi, MI (US)

(73) Assignee: Visteon Global Tech, Inc., Dearborn, MI (US)

( * ) Notice: Subject to any disclaimer, the term of this patent is extended or adjusted under 35 U.S.C. 154(b) by 0 days.

(21) Appl. No.: 09/642,178

(22) Filed: Aug. 18, 2000

(51) Int. Cl.[7] ............................................. H01J 40/14
(52) U.S. Cl. ........................ 250/214 AL; 250/214 L; 250/214 A
(58) Field of Search .................. 250/214 AL, 214 LA, 250/214 R, 214 A, 214 B, 214 DC, 214 L; 330/59, 110, 308; 327/350, 351, 352

(56) References Cited

U.S. PATENT DOCUMENTS 4,933,543 A * 6/1990 Hull ........................ 250/214 C
5,260,563 A * 11/1993 Hunter et al. ............... 250/214
5,286,969 A * 2/1994 Roberts .................. 250/214 A \* cited by examiner

*Primary Examiner*—Kevin Pyo
*Assistant Examiner*—Seung C. Sohn
(74) *Attorney, Agent, or Firm*—Visteon Global Tech, Inc.

(57) ABSTRACT

A light sensor assembly 10 and a method for detecting ambient light 100 which logarithmically amplifies a first signal which is representative of the certain amount of sensed light and a second offset signal and which adds the logarithmically amplified signals to a voltage signal, thereby allowing an accurate signal to be produced which indicative of the sensed amount of light by use of only a positive type electrical power supply and which is effective to allow the output signal to fall within the relatively narrow operating range of a cost effective digital to analogue converter.

13 Claims, 1 Drawing Sheet

US 6,479,810 B1

LIGHT SENSOR SYSTEM AND A METHOD FOR DETECTING AMBIENT LIGHT

FIELD OF THE INVENTION

The present invention generally relates to a light sensor system and to a method for detecting ambient light and more particularly, to an ambient light sensor system which accurately detects the level of ambient light in a logarithmic manner, which allows a cost effective analog to digital converter to be used in combination with a single positive voltage or energy type power supply, and which reduces and/or substantially minimizes dark current and temperature related errors.

BACKGROUND OF THE INVENTION

A light sensor is used to detect the level of ambient light (i.e., the amount or "level" of light present or occurring within the environment that the sensor is disposed within) and to produce an output signal representative of the detected amount or level of such ambient light. The produced output signal is then used by a wide variety of devices and assemblies, such as display devices, to operationally adjust one or more respective attributes or characteristics (e.g., the intensity of a displayed image) of these devices and/or assemblies.

While light sensors do generally detect the level of such ambient light, they suffer from some drawbacks. For example and without limitation, the measurement accuracy of a linear light sensor system remains substantially constant over its operational range and does not desirably provide increased accuracy and resolution as the light level decreases. Moreover, the measurement accuracy of silicon type photodiode sensors at relatively low illumination levels are often undesirably reduced by "dark current" error which is generally a function of temperature and reverse bias voltage.

While some attempts have been made to produce a light sensor system and a concomitant method to detect ambient light which overcomes these previously delineated drawbacks, such attempts require a relatively costly and relatively highly accurate analog to digital converter and/or a relatively costly and complicated digital signal processing assembly, and may further require a relatively costly and complicated power assembly which is operative in both the positive and negative electrical power ranges.

There is therefore a need for a new and improved light sensor system and a method for detecting ambient light which overcomes some or all of the previously delineated drawbacks associated with prior light sensors and prior methods for detecting ambient light.

SUMMARY OF THE INVENTION

It is a first object of the present invention to provide a light sensor system and a method for detecting ambient light which overcomes some or all of the previously delineated drawbacks of prior light sensor systems and prior methods for detecting ambient light.

It is a second object of the present invention to provide a light sensor system and a method for detecting ambient light which overcomes some or all of the previously delineated drawbacks of prior light sensor systems and prior methods for detecting ambient light by logarithmically amplifying a dynamically adjusted electrical current value.

It is a third object of the present invention to provide a light sensor system and a method for detecting ambient light which overcomes some or all of the previously delineated drawbacks of prior light sensor systems and prior methods for detecting ambient light by the use of a single electrical power supply assembly which operatively provides electrical power only in the positive power range.

It is a fourth object of the present invention to provide a light sensor system and a method for detecting ambient light which overcomes some or all of the previously delineated drawbacks of prior light sensor systems and prior methods for detecting ambient light by providing a light sensor system output voltage range which is compatible with a rather limited analog to digital converter input voltage range and, more particularly, varies from about zero volts to about five volts.

It is a fifth object of the present invention to provide a light sensor system and a method for detecting ambient light which overcomes some or all of the previously delineated drawbacks of prior light sensor systems and prior methods for detecting ambient light and which produces a relatively accurate output signal which is resistant to temperature variation and dark current type errors.

It is a sixth object of the present invention to provide a substantially omnidirectional light sensing system and method which is resistant to shadowing effects in a diffuse ambient lighting environment and which is adapted to detect the illumination level of direct specular sunlight from substantially all semi-hemispherical angles.

According to a first aspect of the present invention, a light sensor system is provided. The light sensor system produces an electrical current signal which is representative of an amount of light, which creates a current reference and a voltage offset signal, and which further logarithmically amplifies the ratio of the produced current signal and the reference current signal and adds the amplified ratio to the voltage offset signal, thereby creating a light detection signal.

According to a second aspect of the present invention, a method for detecting ambient light is provided. The method includes the steps of producing a first signal by the use of the ambient light; producing a second signal; and logarithmically amplifying the first and the second signal, thereby producing an output signal which is indicative of the amount of ambient light.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
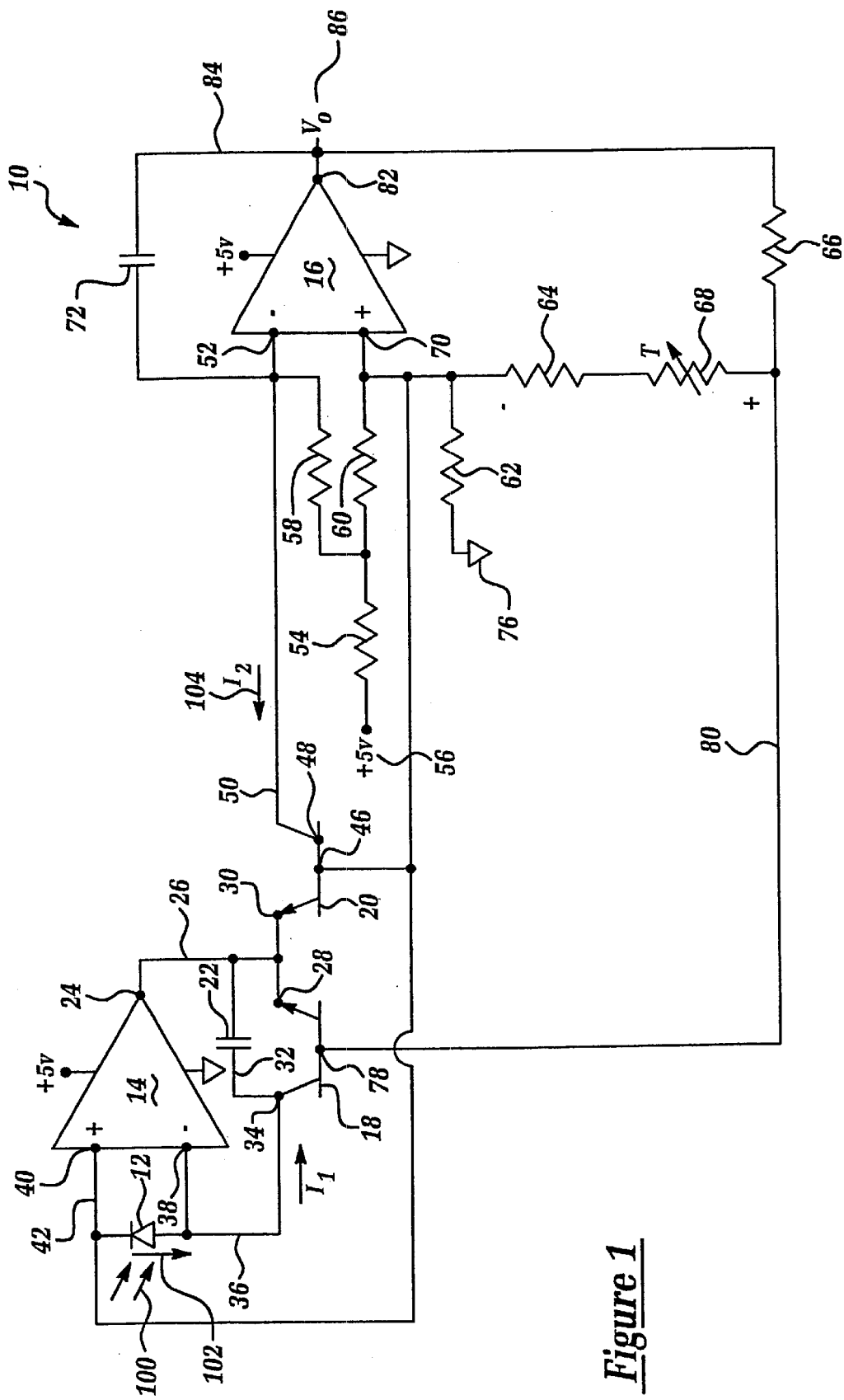
FIG. 1 is an electrical schematic diagram of a light sensor system which is made in accordance with the teachings of the preferred embodiment of the invention.

Referring now to FIG. 1, there is shown an electrical schematic diagram of a light sensor system 10 which is made in accordance with the teachings of the preferred embodiment of the invention. Particularly, light sensor system 10 includes a light detector 12 which, in one non-limiting embodiment of the invention, comprises a commercially available model SFH 203P "silicon pin" type photodiode which is available from the Infineon Corporation or a silicon type temperature sensor, and a pair of operational amplifiers 14, 16. In one non-limiting embodiment of the invention, each of the operational amplifiers 14, 16 comprise a commercially available model TLC 2272 dual operational "rail To rail" amplifier which is available from the Texas Instruments Corporation. Importantly, photodiode 12 receives light in a substantially omnidirectional manner due to the substantially co-planar placement of the light reception surface of the photodiode 12 with the packaging or containment surface of the housing into which the system 10 is operatively disposed. In one non-limiting embodiment, photodiode 12 comprises a fresnel type optical assembly which is adapted to obtain a desired "wide angle" omnidirectional performance which is resistant to shadowing effects in a diffuse ambient lighting environment and which is adapted to detect the illumination level of direct specular sunlight from substantially all semi-hemispherical angles relative to the photodiode 12. Further, photodiode 12 may be selectively operated in the photoamperic mode, where there is substantially zero volts across the photodiode 12, thereby substantially reducing undesired "dark current" type error.

Particularly, amplifier 14 substantially maintains about zero volts of voltage across photodiode 12, by the use of negative feedback, by controlling the emitter 28 of transistor 18 such that the sufficient current flows through transistor 18 to allow the voltage at terminal 38 to be substantially equal to the voltage at terminal 40. However, since the base terminal 78 of transistor 18 is controlled by amplifier 16 in order to maintain a constant current (which is denoted as "$I_2$") through transistor 18, as will be discussed, the voltage provided to the emitter 28 of transistor 18 will vary in order to substantially maintain the voltage at terminal 38 equal to the voltage at terminal 40, thereby maintaining a difference of about zero volts across photodiode 12. This operation is achieved since a positive voltage is applied to terminal 40 which allows for proper bias conditions to be maintained on transistor 18 and which still "fall within" the common mode voltage input range of amplifier 14. Moreover, amplifiers 14, 16 desirably have an operative voltage range which varies from about 0 volts to about +5 volts and are each adapted to allow operation to occur within the entirety of their respectively provided ranges (i.e., these amplifiers 14, 16 operate as "rail to rail" type amplifiers in this range), thereby desirably and substantially eliminating the need for "clap trap" interface circuitry.

As discussed, light sensor system 10 includes a pair of substantially similar transistors 18, 20. In one non-limiting embodiment of the invention, each of the transistors 18, 20 comprise a model MBT3904DW1T1 dual-purpose transistor which is available from the Motorola Corporation. Further, as shown, light sensor system 10 includes a capacitor 22 which is coupled, by bus 26, to the output terminal 24 of the amplifier 14 and to the respective emitter terminals 28, 30 of the transistors 18, 20. Capacitor 22 is further coupled, by bus 32, to the collector terminal 34 of the transistor 18 and, in one non-limiting embodiment of the invention, has a capacitance value of about 100 pF. The collector terminal 34 is further coupled, by bus 36, to the anode of photodiode 12 and to the negative terminal 38 of the amplifier 14. The positive terminal 40 of the amplifier 14 is coupled, by bus 42, to the cathode of photodiode 12 and to the base terminal 46 of the transistor 20. As is further shown, the collector terminal 48 of the transistor 20 is coupled, by bus 50, to the negative terminal 52 of the amplifier 16.

The light sensor system 10 also includes a first resistor 54 and a voltage supply 56 which is coupled to the first resistor 54 and which produces a substantially constant amount of positive voltage which is equal to about five volts. Further, light sensor system 10 includes resistors 58, 60, 62, 64, and 66 and a temperature dependent resistor 68. In one non-limiting embodiment of the invention, resistors 58, 60, 62, 64, and 66 have a respective resistance value of about 100 Kohms, 10 ohms, 549 ohms, 2 Kohms, and 59 Kohms, and resistor 68 comprises a commercially available model KT230 which is available from the Infineon corporation.

As shown, resistor 54 is coupled to resistors 58 and 60, and resistors 58 and 60 are respectively coupled to the negative and positive terminals 52 and 70 of the amplifier 16. Resistor 58 is also coupled to the bus 50 and to a capacitor 72 which, in one non-limiting embodiment of the invention has a capacitance value of about 1 nF. The resistor 60 is further coupled to the positive terminal 70 of the amplifier 16 and to the base terminal 46 of the transistor 20, by bus 42 and the resistor 60 is coupled to the resistor 62. The resistor 62 is also coupled to a source of electrical ground potential 76.

Further, as shown, resistor 64 is coupled to resistors 62 and 68, and resistor 68 is coupled to resistor 66 and to the base terminal 78 of the transistor 18 by the bus 80. Moreover, the output terminal 82 of the amplifier 16 is coupled to the capacitor 72 and to the resistor 66 by bus 84. Output voltage 86 is provided by the amplifier 16 and is representative of the amount of ambient light 100 which is received or "sensed" by the photodiode 12. This output voltage signal is then operatively coupled to an analog to digital converter (not shown). Voltage from source 56 is also applied to amplifiers 14, 16 and each amplifier 14, 16 is coupled to electrical ground.

As is explained below, the output voltage 86 is partially dependent upon the current 104 (i.e., the current flowing on bus 50), the offset voltage at node 70, and the gain controlled by the resistances of the resistors 64, 66, 68. In this manner, these respective current and voltage values may be selectively adjusted in order to ensure that the output voltage 86 substantially always remains in the range of about 0 to about +5 volts, thereby allowing a cost effective analog to digital converter to be utilized and further allowing an operating voltage source 56, producing only positive type voltage, to be utilized, thereby further reducing overall cost.

The ability to operate amplifiers 14, 16 from such a single "positive type" power supply 56 (i.e., only one positive supply 56 is used for the entire circuit or system 10) is particularly suited for automotive circuit environments which typically only include a "positive type" power supply. The temperature dependence of the silicon temperature sensor, or resistor, 68 further allows the assembly 10 to be "temperature compensated" thereby providing accurate "readings" even in environments such as in a vehicle, which are subject to large temperature variations. A silicon temperature resistor 68 provides a significant cost and packaging (i.e., surface mount size) advantage over the use of typical industrial standard technologies of wire wound or ceramic based temperature sensitive resistors.

Thus, upon a sensing of ambient light 100, photodiode 12 generates current 102 on bus 36 which may by proportional to the amount of sensed light. The power supply 56 cooperates with resistors 54, 58, 60 to bias the amplifier 16, thereby producing the offset current 104. Further, by coupling terminals 70 and 40 to the power supply 56, as shown in FIG. 1, the amplifiers 14 and 16 are not required to operate at electrical ground potential or to utilize "negative type" potential. The operation of system 10 will now be explained in greater detail.

First, it should be realized that transistors 18, 20 cooperatively form a logarithmic amplifier assembly and that the following relationship exists:

$$\Delta V = V_{BE1} - V_{BE2} = V_{T1} \ln(I_1/I_{S1}) - V_{T2} \ln(I_2/I_{S2}) = \text{The voltage differential between terminals 78 and 46} \quad \text{(Equation 1)}$$

Where "$V_{BE1}$" denotes the voltage across terminals 78 and 28, "$V_{BE2}$" denotes the voltage across the terminals 46 and 30, "$I_1$" denotes the current flowing into terminal 34 through bus 36, "$I_2$" denotes the current 104, and "$I_{s1}$" and "$I_{s2}$" respectively denote the reverse saturation current of transistors 18, 20.

Since the transistors 18, 20, in the preferred embodiment of the invention, are substantially matched and isothermal, the following relationships exist:

$$V_T = V_{T1} = V_{T2} \quad \text{(Equation 2)}$$

$$I_S = I_{S1} = I_{S2} \quad \text{(Equation 3)}$$

Where, the variables which are delineated above are as follows:

"$I_{S1}$"=the reverse saturation current of transistor 18;
"$I_{S2}$"=the reverse saturation current of transistor 20;
"$I_S$"=Reverse Saturation Current; and
"$V_T$"=the ratio of "KT/q" for each transistor 18, 20 where K=Boltzman's constant=$1.381 \times 10^{-23}$, T=Absolute temperature in Kelvin, q=the charge of an electron=$1.602 \times 10^{-19}$ C Substituting equations 2 and 3 into equation 1 yields the following relationship:

$$\Delta V = V_T \ln(I_1/I_2) \quad \text{(Equation 4)}$$

Thus, the reverse saturation current, $I_{S2}$ of transistor 20 substantially negates and/or "compensates" for the temperature dependent reverse saturation current, $I_{S1}$, of transistor 18, since the reverse saturation current terms of each transistor 18, 20 cancel. If the transistors 18, 20 are substantially "matched" and operate in an isothermal manner, the following condition is created:

$$\Delta V = V_T \ln(I_1/I_{S1}) - V_T \ln(I_2/I_{S2}) = V_T \ln[(I_1 * I_{S2})/(I_2 * I_{S1})] = V_T \ln(I_1/I_2) \quad \text{(Equation 5)}$$

The constant reference current, $I_2$, is used in conjunction with the offset voltage at terminal 70 to adjust and center the dynamic range of the photocurrent, $I_1$, to be within the dynamic output voltage range of the operational amplifier, 16. Therefore, the term denoted as "$\Delta V$" may be rewritten as follows:

$$\Delta V = V_T \ln[I_1/I_2] = V_T \ln[I_1] - V_T \ln[I_2] \quad \text{(Equation 6)}$$

and the "$I_2$" term may represent a substantially constant offset term.

Solving for the term "$V_o$" (i.e., the output voltage 86) within the previously delineated fourth equation yields the following solution, $$V_o = \frac{\Delta V}{R_1'} \times \left[ R_1' + R_2 \frac{R_4}{1 + \frac{R_4 R_8}{R_3 R_7 + R_7 R_8 + R_3 R_8}} \right] + \quad \text{(Equation 7)}$$

$$\frac{\frac{5V \times R_4}{Y R_3 R_7} - i_p R_4}{1 + \frac{R_4 R_8}{R_3 R_7 + R_7 R_8 + R_3 R_8}}$$

Where "$R_1'$" is the sum of the resistance of resistor 64 and the resistance of resistor 68; "$R_2$" is the resistance of resistor 66; "$R_3$" is the resistance of resistor 60; "$R_4$" is the resistance of resistor 62; "$R_7$" is the resistance of resistor 54; and "$R_8$" is the resistance of resistor 58; Y is the parallel admittance of $R_3$, $R_7$, and $R_8$ and is equal to $[(1/R_3)+(1/R_7)+(1/R_8)]$; and "$i_p$" is the amount of photodiode current 102 within the assembly 10.

Equation 7 may be simplified to yield equation 8 if the value of "$R_7$" is very much smaller than the value of "$R_8$". This constraint is satisfied in the preferred embodiment of the invention since the value of "$R_7$" is about 432 ohms and the value of "$R_8$" is about 100 Kohms. Hence, the following equation 8 may be developed:

$$V_o \cong \frac{\Delta V}{R_1'} [R_1' + R_2 + R_{Th}] + V_{Th} - i_p R_{Th} \quad \text{(Equation 8)}$$

where the term "$V_{Th}$" is an offset voltage signal and may be expressed as follows:

$$V_{Th} = \frac{5V \times R_4}{R_3 + R_4 + R_7} \quad \text{(Equation 9)}$$

and the term "$R_{TH}$" may be expressed as follows:

$$R_{Th} = \frac{R_4(R_3 + R_7)}{R_3 + R_4 + R_7} \quad \text{(Equation 10)}$$

A further simplification may be accomplished by neglecting the contribution emanating from the term "$i_p R_{TH}$". That is, in the preferred embodiment of the invention, the value of the photocurrent 102 is equal to a range of about 10 $\mu$A to about 30 $\mu$A. Therefore the value of the term "$i_p R_{Th}$" may be computed as follows:

$$I_p R_{Th} = 30 \; \mu A \times 245 \Omega = 7.4 \; mV \quad \text{(Equation 11)}$$

Hence, the value of the term "$i_p R_{Th}$" is negligible.

By neglecting the "$i_p R_{Th}$" term, Equation 6 may be simplified as follows:

$$V_o \cong \frac{\Delta V}{R_1'} [R_1' + R_2 + R_{Th}] + V_{Th} \quad \text{(Equation 12)}$$

Moreover, by replacing the term "$R_1'$" with the term "$R_1 + R_T$", where $R_T$ is resistor 68, equation 11 may be transformed as follows:

$$V_o \cong \left[ \frac{\Delta V}{R_1 + R_T} \right] [R_1 + R_T + R_2 + R_{Th}] + V_{Th} \quad \text{(Equation 13)}$$

$$= \Delta V \times A_V + V_{Th}$$

where the term "$A_V$" is substantially equal to $$\frac{[R_1 + R_T + R_2 + R_{Th}]}{\lfloor R_1 + R_T \rfloor}$$

Hence, it may be observed that the output voltage, "$V_o$", is substantially equal to the summation of the product of the term "$\Delta V$" and a gain factor, and an offset voltage term, "$V_{Th}$". By substituting Equation 4 into Equation 13, and observing that the term "$I_1$"=the term "$i_p$", Equation 14 may be created as follows.

$$V_o \cong \frac{[V_T \ \ln(i_p/I_2)]}{\lfloor R_1 + R_T \rfloor}[R_1 + R_T + R_2 + R_{Th}] + V_{Th} \quad \text{(Equation 14)}$$

Since the value of the term "$V_T$" increases linearly with temperature, the temperature sensitive resistor 68 is used, in the preferred embodiment of the invention, to compensate and minimize this temperature sensitivity. In the preferred embodiment of the invention, as shown in and described with respect to FIG. 1, the term "$V_T$" for each of the transistors 18, 20 were measured at temperatures of about 23.4° C. and 83.6° C. and as follows:

$V_T$=26.38 mV @ T=23.4° C.

$V_T$=31.48 mV @ T=83.6° C.

Using these measured values, the resistor values for the terms "$R_1$", "$R_2$", and "$R_{Th}$" may then be determined, in practice, by first selecting and placing a desired gain term "$A_V$" in Equation 13.

Due to system parameters, one possible value of the gain of "$A_V$" is about 20.74 which is suitable for the dynamic range encountered in the automotive lighting environment.

Therefore, due to an increase in the term "$V_T$", the gain must decrease from a value of about 20.74 at a temperature of about 23.4° C. to a value of about 17.8 at a temperature of about 83.6° C. This is accomplished by selecting the proper ratios between resistor values by use of the following equations:

$$\frac{V_{T@23.4°C.} \times [R_1 + R_{T@23.4°C.} + R_2 + R_{Th}]}{R_1 + R_{T@23.4°C.}} = \quad \text{(Equation 15)}$$

$$\frac{V_{T@83.6°C.} \times [R_1 + R_{T@83.6°C.} + R_2 + R_{Th}]}{R_1 + R_{T@83.6°C.}}$$

Selecting the value of the term "$R_{Th}$" to be about 245 ohms, and noting that the value of the term "$R_{T@23.4°\ C.}$" is about 1 Kohm and that the value of the term $R_{T@83.6°\ C.}$ is about 1.6 Kohm, Equations 15 and 13 may be used to simultaneously solve for the terms of "$R_1$" and "$R_2$" in the following manner:

$$R_1 = \quad \text{(Equation 16)}$$

$$\frac{(V_{T@83.6°C.}/V_{T@23.4°C.})}{[(A_{V@83.6°C.} - 1)(R_{T@23.4°C.}) + R_{T@83.6°C.}] - \frac{(A_{V@23.4°C.})(R_{T@83.6°C.})}{(A_{V@23.4°C.})[1 - (V_{T@83.6°C.}/V_{T@23.4°C.})]}} = 1.93K\Omega$$

$$R_2=(A_{V@23.4°\ C.})(R_1+R_{T@23.4°\ C.})-(R_1+R_{T@23.4°\ C.}+R_{Th})=57.5\ K\Omega \quad \text{(Equation 17)}$$

Moreover, in the preferred embodiment of the invention, the terms "$R_7$", "$R_3$" and "$R_4$" were selected to cooperatively yield the following Thevenin equivalents:

$$V_{Th} = \frac{5V \times R_4}{R_3 + R_4 + R_7} = 2.76V \quad \text{(Equation 18)}$$

$$R_{Th} = \frac{R_4(R_3 + R_7)}{R_3 + R_4 + R_7} = 245\Omega \quad \text{(Equation 19)}$$

The reference current 104 is generated or realized by developing a reference voltage resistor 60. That is, since resistor 58 is much greater than the source impedance cooperatively formed by the resistors 62, 60, and 54, the voltage across the resistor 60 may be approximated as follows:

$$"V_{R3}" = \frac{5V \times R_3}{R_7 + R_3 + R_4} = 0.05045V \quad \text{(Equation 20)}$$

Due to negative feedback, the voltage at terminal 52 substantially equals the voltage at terminal 70 and the voltage developed across 58 is substantially equal to the voltage that is developed across resistor 60. Therefore the reference current 104 is calculated to be as follows:

$$I_2 = V_{R3}/R_8 = \ = \frac{5V \times R_3}{R_8(R_7 + R_3 + R_4)} = 0.5045\mu A \quad \text{(Equation 21)}$$

Note that the reference current source current 104, denoted as "$I_2$" is independent of the voltage developed across the collection terminal 48 of transistor 20.

Lastly, the output voltage 86 may be calculated as follows:

$$V_o \cong \frac{[V_T \ \ln(i_p/I_2)]}{\lfloor R_1 + R_T \rfloor}[R_1 + R_T + R_2 + R_{Th}] + V_{Th} \quad \text{(Equation 22)}$$

$$= (0.02638V)(20.74)(\ln(i_p/0.5\mu A) + 2.76V$$

$$= 0.547V(\ln(i_p/0.5\mu A) + 2.76V$$

It is understood that the invention is not to be limited to the exact construction and/or method which has been illustrated and discussed above, but that various changes and/or modifications may be made without departing from the spirit and the scope of the invention.

What is claimed is:

1. A light sensor assembly comprising:
    a photodiode which detects a certain amount of light and, in response to said detected certain amount of light, generates an electrical current signal;
    a first amplifier which is coupled to said photodiode;
    a logarithmic amplifier circuit which is coupled to said photodiode and to said first amplifier;
    a second amplifier which is coupled to said logarithmic amplifier circuit; and
    a power supply which only provides a voltage signal having an amplitude which is greater than zero and wherein said second amplifier causes an offset current signal to flow through said logarithmic amplifier, effective to cause said photodiode to only operate in a photoamperic mode and wherein said logarithmic amplifier produces a voltage output signal which is communicated to said second amplifier, said second amplifier further receiving an offset voltage signal which cooperates with said received voltage output signal to cause said second amplifier to produce an output signal which is representative of said detected certain amount of light, said output signal being constrained to vary only between zero and five volts.

2. The light sensor assembly of claim 1 wherein said photodiode comprises an omnidirectional fresnel optic portion.

3. The light sensor assembly of claim 1 wherein said first amplifier comprises a dual operational rail-to-rail amplifier.

4. The light sensor assembly of claim 3 wherein said second amplifier comprises a dual operational rail-to-rail amplifier.

5. The light sensor assembly of claim 1 wherein said logarithmic amplifier circuit comprises a first transistor and a second transistor, and wherein said first transistor further comprises an emitter.

6. The light sensor assembly of claim 5 wherein said first and said second transistors are substantially matched and isothermal.

7. The light sensor assembly of claim 5 wherein said first amplifier substantially maintains about zero volts of voltage across said photodiode by the use of negative feedback.

8. The light sensor assembly of claim 7 wherein said first amplifier further comprises a positive terminal and a negative terminal and wherein said first amplifier controls said emitter such that the current flows through said first transistor to allow the voltage at said negative terminal of said first amplifier to substantially equal the voltage at said positive terminal of said first amplifier.

9. The light sensor assembly of claim 1 wherein said photodiode comprises a silicon temperature sensor, effective to substantially reduce the temperature sensitivity of said light sensor assembly.

10. A method for detecting ambient light by use of a light sensor assembly, said method comprising the steps of:

providing a power supply which only provides a voltage signal having an amplitude which is greater than zero;

providing a photodiode;

causing said photodiode to detect a certain amount of light;

providing a first amplifier;

coupling said first amplifier to said photodiode;

providing a logarithmic amplifier circuit;

coupling said logarithmic amplifier circuit to said photodiode and to said first amplifier;

providing a second amplifier;

coupling said second amplifier to said logarithmic amplifier circuit;

causing an offset current signal from said second amplifier to flow through said logarithmic amplifier;

causing said logarithmic amplifier to produce a voltage output signal;

communicating said voltage output signal to said second amplifier;

causing said second amplifier to receive an offset voltage signal;

causing said offset voltage signal to cooperate with said voltage output signal;

causing said second amplifier to produce an output signal which is representative of said detected certain amount of light; and constraining said output signal to vary only between zero and five volts.

11. The method of claim 10 wherein said step of causing said photodiode to detect a certain amount of light further comprises the step of causing said photodiode to generate an electrical current signal in response to said detected certain amount of light.

12. The method of claim 10 wherein said step of providing a second amplifier further comprises the steps of:

providing a first resistor;

providing a second resistor;

providing a third resistor;

coupling said first resistor to the negative terminal of said second amplifier;

coupling said second resistor to the positive terminal of said second amplifier;

coupling said third resistor to said first and said second resistors; and coupling said third resistor to said power supply.

13. The method of claim 12 further comprising the steps of:

providing a fourth resistor;

providing a fifth resistor;

providing a sixth temperature dependant resistor;

providing a seventh resistor;

coupling said fourth resistor to said positive terminal of said second amplifier;

coupling said fifth resistor to said positive terminal of said second amplifier between said fourth resistor and said second resistor;

coupling said sixth temperature dependant resistor to said logarithmic amplifier and to said fourth resistor; and coupling said seventh resistor to said logarithmic amplifier and to said negative terminal of said second amplifier.

* * * * *